United States Patent
Meshi et al.

(10) Patent No.: US 10,592,777 B2
(45) Date of Patent: Mar. 17, 2020

(54) SYSTEMS AND METHODS FOR SLATE OPTIMIZATION WITH RECURRENT NEURAL NETWORKS

(71) Applicant: Google LLC, Mountain View, CA (US)

(72) Inventors: Ofer Pinhas Meshi, San Jose, CA (US); Irwan Bello, San Francisco, CA (US); Sayali Satish Kulkarni, Sunnyvale, CA (US); Sagar Jain, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/417,148

(22) Filed: May 20, 2019

(65) Prior Publication Data

US 2019/0354796 A1 Nov. 21, 2019

Related U.S. Application Data

(63) Continuation of application No. 16/415,854, filed on May 17, 2019.

(60) Provisional application No. 62/673,821, filed on May 18, 2018.

(51) Int. Cl.
| | |
|---|---|
| *G06K 9/62* | (2006.01) |
| *G06N 3/04* | (2006.01) |
| *G06N 20/00* | (2019.01) |
| *G06F 17/18* | (2006.01) |
| *G06Q 30/02* | (2012.01) |

(52) U.S. Cl.
CPC ............ *G06K 9/623* (2013.01); *G06F 17/18* (2013.01); *G06K 9/6257* (2013.01); *G06N 3/049* (2013.01); *G06N 20/00* (2019.01); *G06Q 30/0202* (2013.01)

(58) Field of Classification Search
CPC ........ G06K 9/623; G06N 20/00; G06N 20/10; G06N 20/20
See application file for complete search history.

(56) References Cited

U.S. PATENT DOCUMENTS

| | | | |
|---|---|---|---|
| 2018/0082171 A1* | 3/2018 | Merity | G06F 17/277 |
| 2019/0043379 A1* | 2/2019 | Yuan | G09B 7/02 |
| 2019/0130248 A1* | 5/2019 | Zhong | G06F 16/93 |

OTHER PUBLICATIONS

Bello et al. "Neural Combinatorial Optimization with Reinforcement Learning." arXiv:1611.009940v2, Jan. 21, 2017. (Year: 2017).*
Ai et al. "Learning a Deep Listwise Context Model for Ranking Refinement." arXiv:1804.05936v2. Apr. 23, 2018. (Year: 2018).*

(Continued)

*Primary Examiner* — Austin Hicks
*Assistant Examiner* — Joseph V Nguyen
(74) *Attorney, Agent, or Firm* — Dority & Manning, PA (57) ABSTRACT

Systems and methods for generating a slate of ranked items are provided. In one example embodiment, a computer-implemented method includes inputting a sequence of candidate items into a machine-learned model, and obtaining, in response to inputting the sequence of candidate items into the machine-learned model, an output of the machine-learned model that includes a ranking of the candidate items that presents a diverse set of the candidate items at the top positions in the ranking such that one or more highly relevant candidate items can be demoted in the ranking.

20 Claims, 5 Drawing Sheets

(56) References Cited

OTHER PUBLICATIONS

Bahdanau et al. "Neural Machine Translation by Jointly Learning to Align and Translate", arxiv:1409.0473v6, Apr. 24, 2015, 15 pages.
Bahdanau et al., "An Actor-Critic Algorithm for Sequence Prediction", International Conference on Learning Representations, Apr. 24-26, 2017, Toulon, France, 17 pages.
Bello et al., "Neural Combinatorial Optimization with Reinforcement Learning", International Conference on Learning Representations, Apr. 24-26, 2017, Toulon, France, 16 pages.
Burges et al., "Learning to Rank Using Gradient Descent", International Conference on Machine Learning, Aug. 11-13, 2005, Bonn, Germany, 8 pages.
Cao et al., "Learning to Rank: From Pairwise Approach to Listwise Approach", International Conference on Machine Learning, Jun. 20-24, 2007, Corvallis, Oregon, 9 pages.
Dokania et al., "Learning to Rank Using High-Order Information", European Conference on Computer Vision, Sep. 6-12, 2014, Zurich, Switzerland, 15 pages.
Herbrich et al., "Support Vector Learning for Ordinal Regression", International Conference on Artificial Neural Networks, Edinburgh, United Kingdom, Sep. 7-10, 1999, 6 pages.
Hochreiter et al., "Long Short-Term Memory", Neural Computation, vol. 9, No. 8, 1997, 32 pages.
Huang et al., "Learning Deep Structured Semantic Models for Web Search using Clickthrough Data", International Conference on Information and Knowledge Management, Oct. 2013, 8 pages.
Joachims, "Optimizing Search Engines using Clickthrough Data", International Conference on Knowledge Discovery and Data Mining, Jul. 23-26, 2002, Alberta, Canada, 10 pages.
Joachims et al., "Unbiased Learning-to-Rank with Biased Feedback", International Joint Conference on Web Search and Data Mining, Feb. 6-10, 2017, Cambridge, United Kingdom, pp. 781-789.
Kingma et al., "Adam: A Method for Stochastic Optimization", arXiv:1412.6980v1, Dec. 22, 2014, 9 pages.
Leblond et al., "SEARNN: Training RNNS with Global-Local Losses", International Conference on Learning Representations, Apr. 30-May 3, 2018, Vancouver, British Columbia, 16 pages.
Liu et al., "Learning to Rank for Information Retrieval", Foundations and Trends in Information Retrieval, vol. 3, No. 3, 2009, pp. 225-331.
Mitra et al., "Neural Models for Information Retrieval", arXiv:1705.01509v1, May 3, 2017, 52 pages.
Nam et al., "Maximizing Subset Accuracy with Recurrent Neural Networks in Multi-Label Classification", Conference on Neural Information Processing System, Dec. 4-9, 2017, Long Beach, California, 11 pages.
Palangi et al., Deep Sentence Embedding Using Long Short-Term Memory Networks: Analysis and Application to Information Retrieval, arXiv:1502.06922v3, Jan. 16, 2016, 25 pages.
Qin et al., "Learning to Rank Relational Objects and its Application to Web Search", International World Wide Web Conference, Apr. 21-25, 2008, Beijing, China, pp. 407-416.
Qin et al., "Global Ranking Using Continuous Conditional Random Fields", International Conference on Neural Information Processing Systems, Dec. 8-10, 2008, Vancouver, British Columbia, 8 pages.
Ranzato et al., "Sequence Level Training with Recurrent Neural Networks", arXiv:1511.06732v7, May 6, 2016, 16 pages.
Rosenfeld et al., "Learning Structured Models with the AUC Loss and its Generalizations", International Conference on Artificial Intelligence and Statistics, Apr. 22-25, 2014, Reykjavik, Iceland, pp. 841-849.
Schuster et al., "Bidirectional Recurrent Neural Networks", Transactions on Signal Processing, vol. 45, No. 11, Nov. 1997, pp. 2673-2681.
Sutskever et al., "Sequence to Sequence Learning with Neural Networks", Conference on Neural Information Processing Systems, Dec. 8-13, 2014, Montreal, Canada, 9 pages.
Vaswani et al., "Attention is All You Need", Conference on Neural Information Processing Systems, Dec. 4-9, 2017, Long Beach, California, 11 pages.
Vinyals et al., "Grammar as a Foreign Language", Conference on Neural Information Processing Systems, Dec. 7-12, 2015, Montreal, Canada, 9 pages.
Vinyals et al., "Pointer Networks", Conference on Neural Information Processing Systems, Dec. 7-12, 2015, Montreal, Canada, 9 pages.
Vinyals et al., "Show and Tell: A Neural Image Caption Generator", Conference on Computer Vision and Pattern Recognition, Jun. 7-12, 2015, Boston, Massachusetts, pp. 3156-3164.
Vinyals et al., "Order matters: Sequence to Sequence for Sets", International Conference on Learning Representations, May 2-4, 2016, San Juan, Puerto Rico, 11 pages.
Wang et al., "CNN-RNN: A Unified Framework for Multi-Label Image Classification", arXiv:1604.04573v1, Apr. 15, 2016, 10 pages.
Williams, "Simple Statistical Gradient Following Algorithms for Connectionist Reinforcement Learning", Machine Learning, vol. 8, Issue 3-4, May 1992, 27 pages.
Wiseman et al., "Sequence-to-Sequence Learning as Beam-Search Optimization", Conference on Empirical Methods in Natural Language Processing, Nov. 1-6, 2016, Austin, Texas, pp. 1296-1306.
Yue et al., "A Support Vector Method for Optimizing Average Precision", International Special Interest Group on Information Retrieval Conference, Jul. 23-27, 2007, Amsterdam, the Netherlands, 8 pages.
Zhu et al., "Learning for Search Result Diversification", International Special Interest Group on Information Retrieval Conference, Jul. 6-11, 2014, Queensland, Australia, pp. 293-302.

* cited by examiner

SYSTEMS AND METHODS FOR SLATE OPTIMIZATION WITH RECURRENT NEURAL NETWORKS

PRIORITY CLAIM

The present application claims the benefit of priority of U.S. Provisional Patent Application No. 62/673,821 filed May 18, 2018, entitled "Systems And Methods For Slate Optimization with Recurrent Neural Networks," and U.S. Non-Provisional patent application Ser. No. 16/415,854 filed May 17, 2019, entitled "Systems And Methods For Slate Optimization with Recurrent Neural Networks." The above-referenced patent application is incorporated herein by reference.

FIELD

The present disclosure relates generally to generating a slate of ranked items.

BACKGROUND

Ranking is a central task in machine learning and information retrieval. In this task, it is especially important to present the user with a slate of items that is useful.

SUMMARY

Aspects and advantages of the present disclosure will be set forth in part in the following description, or may be learned from the description, or may be learned through practice of the embodiments.

One example embodiment of the present disclosure is directed to a computer system that includes one or more processors, and one or more non-transitory computer readable media that collectively store a machine-learned pointer network for generating an output sequence from a list of candidate items. The machine-learned pointer network can include an encoder network configured to receive the list of candidate items and provide an output that includes a sequence of latent memory states. The machine-learned pointer network can include a decoder network configured to receive a previously-selected candidate item for the output sequence and provide an output vector based at least in part on the previously-selected candidate item. The machine-learned pointer network can include an attention network configured to receive the sequence of latent memory states and a query including the output vector from the decoder network, and produce a probability distribution associated with a next candidate item to include in the output sequence. The attention network can produce the probability distribution based at least in part on candidate items that already appear in the output sequence. The machine-learned pointer network can include instructions that, when executed by the one or more processors, cause the computer system to perform operations. The operations can include providing an input associated with the list of candidate items to the machine-learned pointer network. The operations can include implementing the machine-learned pointer network to process the list of candidate items. The operations can include receiving an output generated by the machine-learned pointer network as a result of processing the list of candidate items. The operations can include selecting the next candidate item to include in the output sequence based at least in part on the probability distribution.

Another example embodiment of the present disclosure is directed to a computer-implemented method to train a machine-learned pointer network for generating an output sequence from a list of candidate items. The method can include obtaining, by one or more computing devices, data descriptive of the machine-learned pointer network. The machine learned pointer network can include an encoder network configured to receive the list of candidate items and provide an output that includes a sequence of latent memory states, a decoder network that operates over a plurality of decoding steps and is configured to receive a previously-selected candidate item for the output sequence and provide an output vector based at least in part on the previously-selected candidate item, and an attention network configured to receive the sequence of latent memory states and a query including the output vector from the decoder network. The attention network can be configured to produce a probability distribution associated with a next candidate item to include in the output sequence.

The method can include training, by the one or more computing devices, the machine-learned pointer network based on a set of training data. The training, by the one or more computing devices, can include determining, by the one or more computing devices, a per-step loss for two or more of the plurality of decoding steps, the per-step loss representing a performance evaluation of the machine-learned pointer network based on the set of training data. The training can include modifying, by the one or more computing devices, one or more parameters of the machine-learned pointer network based at least in part on the per-step loss.

Another example embodiment of the present disclosure is directed to a computer-implemented method to generate an output sequence from a list of candidate items. The method can include ranking, by one or more computing devices, the list of candidate items to generate an initial sequence of candidate items. The method can include inputting, by the one or more computing devices, the initial sequence of candidate items into an encoder network configured to receive the initial sequence of candidate items and provide an output that includes a sequence of latent memory states. The method can include inputting, by the one or more computing devices, a previously-selected candidate item for the output sequence into a decoder network configured to receive the previously-selected candidate item and provide an output vector based at least in part on the previously-selected candidate item. The method can include inputting the sequence of latent memory states and a query including the output vector from the decoder network into an attention network configured to receive the sequence of latent memory states and the query including the output vector from the decoder network. The attention network can be configured to produce a probability distribution associated with a next candidate item to include in the output sequence.

Another example embodiment of the present disclosure is directed to a computer-implemented method for generating a slate of ranked items. The method includes inputting, by a computing system, a sequence of candidate items into a machine-learned model. The method includes obtaining, by the computing system, in response to inputting the sequence of candidate items into the machine-learned model, an output of the machine-learned model that includes a ranking of the candidate items that presents a diverse set of the candidate items at the top positions in the ranking such that one or more highly relevant candidate items are demoted in the ranking.

Another example embodiment of the present disclosure is directed to a computer-implemented method for training a machine-learned model to generate a slate of ranked items. The method includes obtaining, by a computing system, a training example that includes a sequence of items and a plurality of binary labels, each binary label corresponding to an item in the sequence of items, wherein the binary labels represent user feedback for the corresponding item in the sequence. The method includes training, by the computing system, a machine-learned model with the training example by using the binary labels corresponding to the sequence of items as ground-truth for the sequence.

Another example embodiment of the present disclosure is directed to a computer-implemented method for generating a slate of ranked items. The method includes inputting, by a computing system, a list of candidate items into a machine-learned model. The method includes obtaining, by the computing system, in response to inputting the list of candidate items into the machine-learned model, an output of the machine-learned model that includes a ranking of the candidate items, wherein a placement of at least one candidate item in the ranking is based at least partially on a placement of at least one other candidate item in the ranking.

Another example embodiment of the present disclosure is directed to one or more non-transitory computer-readable media that store a machine-learned model. The machine-learned model can include one or more neural networks. At least one of the neural network(s) is configured to predict, from a list of items, a next item to place in a ranking of items. The next item is selected based at least in a part on one or more items already placed in the raking of items.

Other example aspects of the present disclosure are directed to systems, methods, vehicles, apparatuses, tangible, non-transitory computer-readable media, and memory devices for slate optimization with recurrent neural networks.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Generally, the present disclosure is directed to systems and methods for generating a slate of ranked items that is appealing as a whole. According to some example aspects, a machine-learned pointer network is provided that is trained to point to items of an input sequence, rather than predict an index from a fixed-sized vocabulary. The model can, in some examples, produce a probability distribution based at least in part on candidate items that already appear in an output sequence. A candidate item can be selected for the output sequence based at least in part on the probability distribution. The decoder network can be configured to allow the score of items to change based on previously-selected items. Items that already appear in the output sequence can be assigned a score that can enforce the model to output permutations. In this manner, the model can account for high-order interactions in a manner that can be both natural and scalable. In some examples, a machine-learned pointer network can be trained by providing feedback to the model at each decoder step.

Ranking a set of candidate items is a central task in machine learning and information retrieval. Most existing ranking systems are based on pointwise estimators, where the model assigns a score to each item in a candidate set and the result is obtained by sorting the list according to item scores. Such models are usually trained from click-through data to optimize an appropriate loss function. This simple approach is computationally attractive as it only requires a sort operation over the candidate set at test time, and can therefore scale up to large problems. On the other hand, in terms of modeling, pointwise rankers cannot easily express dependencies between ranked items. In particular, the score of an item (e.g., probability of being clicked) often depends on the other items in the set and their joint placement. Such interactions between items can be especially dominant in the common case where display area is limited or when strong position bias is present, so only few highly ranked items get the user's attention. In this case it may be better, for example, to choose a diverse set of items to present at the top positions in order to cover a wider range of user interests, although this could mean that some highly relevant candidates are demoted.

Traditional work on learning-to-rank only considers interactions between ranked items when training the model, however the ranking function itself is pointwise so at inference time the model still assigns a score to each item which does not depend on scores of other items.

There has been some work on trying to capture interactions between items in the ranking scores. In this case it is possible, for example, to encourage a pair of items to appear next to (or far from) each other in the resulting ranking. Approaches in this category often restrict the functional form of the relational terms to simple functions (e.g., submodular) in order to obtain tractable inference and learning algorithms. Unfortunately, this comes at the expense of the model's expressive power. Alternatively, some greedy or approximate procedure is used for inference, which can still be quite computationally expensive.

Aspects of the present disclosure provide for a sequence-to-sequence model for ranking called SEQ2SLATE. In each step, the model predicts the next item to place on the slate given the items already chosen. Thereby, complex dependencies between items can be captured directly in a flexible and scalable way that naturally accounts for high-order interactions. In particular, a sequence-to-sequence (seq2seq) model is used, where the input is the list of candidate items and the output is the resulting ordering. Since the output sequence corresponds to ranked items on the slate, the model is called SEQ2SLATE.

Aspects of the present disclosure provide for end-to-end training of the SEQ2SLATE model to directly optimize several commonly used ranking measures. In particular, the training can use weak supervision in the form of click-through logs that are easy to obtain instead of relying on relevance scores or ground-truth rankings, which can be more expensive to obtain.

Aspects of the present disclosure provide for the SEQ2SLATE model to include a machine-learned pointer network for generating an output sequence from a list of candidate items in some examples. In some implementations, the machine-learned pointer network can include an encoding network configured to receive the list of candidate items and provide an output that includes a sequence of latent memory states, a decoder network configured to receive a previously-selected candidate item for the output sequence and provide an output vector based at least in part on the previously-selected candidate item, and an attention network configured to receive the sequence of latent memory states and a query including the output vector from the decoder network to produce a probability distribution associated with a next candidate item to include in the output sequence. In some implementations, a computing system can provide an input with the list of candidate items to the machine-learned pointer network, implement the machine-learned pointer network to process the list of candidate items, receive an output generated by the machine-learned pointer network as a result of processing the list of candidate items; and select the next candidate item to include in the output sequence based at least in part on the probability distribution. In some implementations, the list of candidate items can include a sequence of features associated with the list of candidate items. In some implementations, the machine-learned pointer network can be trained to point to candidate items in the list of candidate items based on a plurality of learned parameters.

In some implementations, the attention network can assign scores to the list of candidate items as part of producing the probability distribution, and the scores assigned to candidate items that already appear in the output sequence can be lower than the scores assigned to candidate items that do not already appear in the output sequence. The scores assigned to candidate items that already appear in the output sequence can enforce the attention network to output permutations.

In some implementations, the decoder network can operate over a plurality of decoding steps. In particular, a learned vector can be provided as an input to a first decoding step of the decoder network, and in response the decoder network can provide an output vector based at least in part on the learned vector. For a second decoding step of the decoder network, an embedding that corresponds to the previously-selected candidate item can be provided as an input.

In some implementations, the encoder network can include a first recurrent neural network that utilizes long short-term memory cells, and the decoder network can include a second recurrent neural network that utilizes long short-term memory cells.

Aspects of the present disclosure provide for training a machine-learned pointer network for generating an output sequence from list of candidate items. In some implementations, the machine-learned pointer network can be trained by a model trainer that is configured to train the machine-learned pointer network based on a set of training data. In particular, the model trainer can include one or more computing devices that can obtain data descriptive of the machine-learned pointer network. The machine-learned pointer network can include an encoder network configured to receive the list of candidate items and provide an output that includes a sequence of latent memory states, a decoder network that operates over a plurality of decoding steps and is configured to receive a previously-selected candidate item for the output sequence and provide an output vector based at least in part on the previously-selected candidate item, and an attention network configured to receive the sequence of latent memory states and a query including the output vector from the decoder network. The attention network can produce a probability distribution associated with a next candidate item to include in the output sequence.

In some implementations, the model trainer (e.g., the one or more computing devices) can train the machine-learned pointer network by determining a per-step loss for two or more of the plurality of decoding steps, and modify one or more parameters of the machine-learned pointer network based at least in part on the per-step loss. The per-step loss can represent a performance evaluation of the machine-learned pointer network based on the set of training data. In some implementations, the model trainer can enforce a permutation constraint on an output of the machine-learned pointer network. In some implementations, the model trainer can modify the one or more parameters of the machine-learned pointer network by backpropagating the per-step loss to train the machine-learned pointer network end-to-end. In some implementations, the model trainer can provide feedback based on the per-step loss to the machine-learned pointer network at each of the plurality of decoding steps of the decoder network.

Aspects of the present disclosure provide for generating an output sequence from a list of candidate items. In particular, the list of candidate items can be ranked to generate an initial sequence of candidate items. The initial sequence of candidate items can be input into an encoder network configured to receive the initial sequence of candidate items and provide an output that includes a sequence of latent memory states. A previously-selected candidate item for the output sequence can be input into a decoder network configured to receive the previously-selected candidate item and provide an output vector based at least in part on the previously-selected candidate item. The sequence of latent memory states and a query including the output vector from the decoder network can be input into an attention network configured to receive the sequence of latent memory states and the query including the output vector from the decoder network, and produce a probability distribution associated with a next candidate item to include in the output sequence. In some implementations, the list of candidate items can include a sequence of features associated with the list of candidate items. In some implementations, the encoder network can include a first recurrent neural network that utilizes long short-term memory cells, and the decoder network can include a second recurrent neural network that utilizes long short-term memory cells. In some implementations, the encoder network, the decoder network, and the attention network can be part of a machine-learned pointer network that is trained to point to candidate items in the list of candidate items based on a plurality of learned parameters.

In some implementations, the decoder network can operate over a plurality of decoding steps including a first decoding step and a second decoding step. A learned vector can be provided as an input to the first decoding step, and in response the decoder network can provide an output vector based at least in part on the learned vector. An embedding that corresponds to the previously-selected candidate item can be input into the second decoding step of the decoder network.

In some implementations, the attention network can be configured to produce the probability distribution based at least in part on candidate items that already appear in the output sequence. A score assigned to each candidate item that already appears in the output sequence can enforce the attention network to output permutations.

With reference now to the Figures, example embodiments of the present disclosure will be discussed in further detail.

Example Devices and Systems

Figure 1:
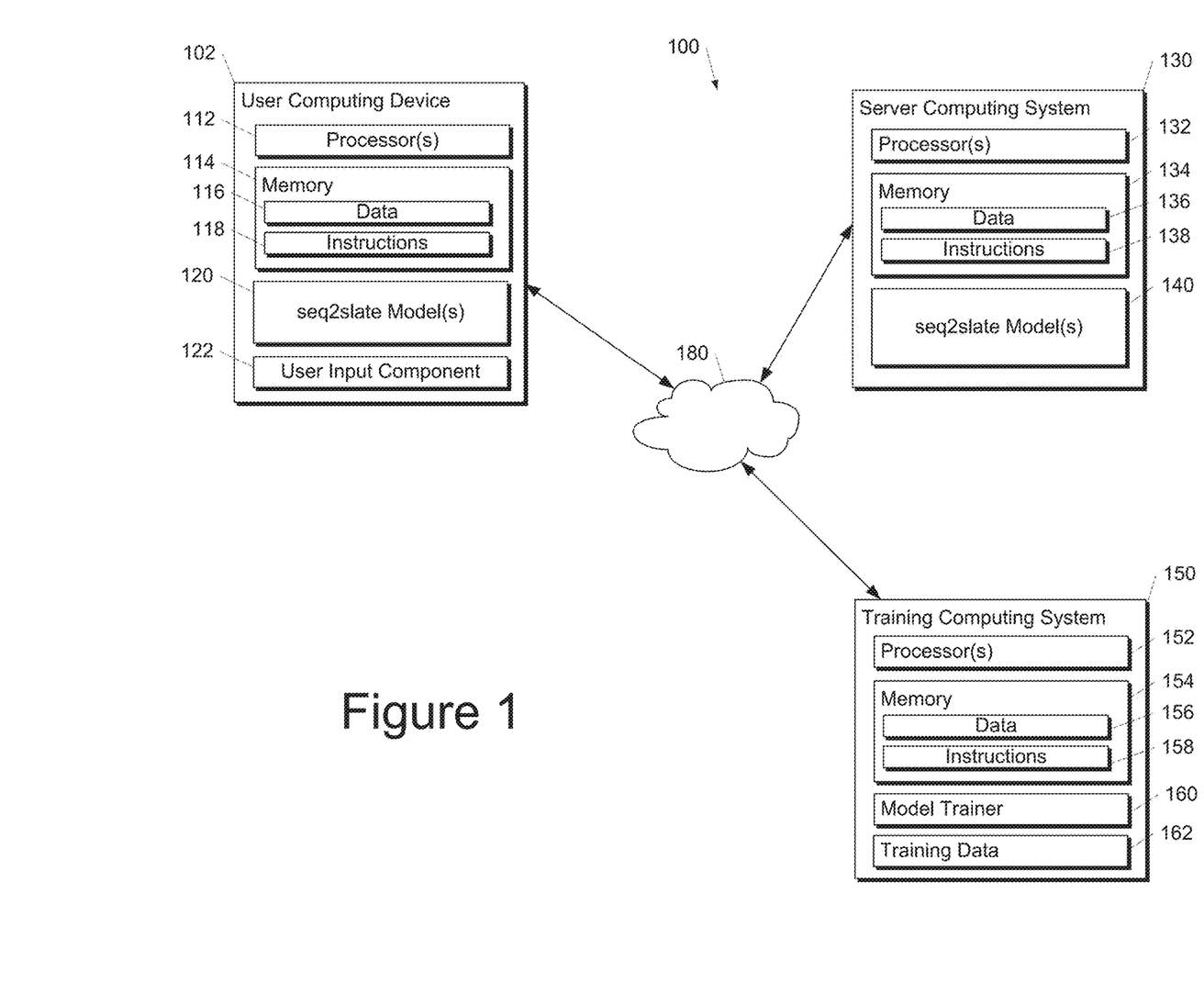
FIG. 1 depicts a block diagram of an example computing system that can generate a slate of ranked items that is appealing as a whole according to example embodiments of the present disclosure.

FIG. 1 depicts a block diagram of an example computing system 100 that can rank an input sequence of items according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more SEQ2SLATE models 120. For example, the SEQ2SLATE models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example SEQ2SLATE models 120 are discussed with reference to FIGS. 2 and 3.

In some implementations, the one or more SEQ2SLATE models 120 can be received from the server computing system 130 over network 180, stored in the user computing device memory 114, and then used or otherwise implemented by the one or more processors 112. In some implementations, the user computing device 102 can implement multiple parallel instances of a single SEQ2SLATE model 120 (e.g., to perform parallel ranking across multiple instances of input sequences).

More particularly, the SEQ2SLATE models 120 can provide a general and scalable approach to ranking, which naturally accounts for high-order interactions. The SEQ2SLATE models 120 can include Recurrent Neural Networks (RNNs) that can capture rich dependencies between ranked items, while keeping the computational cost of inference manageable. In order to support variable-size input sequences, the SEQ2SLATE models 120 can use pointer-networks, which are seq2seq models with an attention mechanism for pointing at positions in the input. In each step, the SEQ2SLATE models 120 predict the next item to place on a slate of ranked items given the items already chosen. Thereby, complex dependencies between items in an input sequence can be captured directly in a flexible and scalable way.

Additionally or alternatively, one or more SEQ2SLATE models 140 can be included in or otherwise stored and implemented by the server computing system 130 that communicates with the user computing device 102 according to a client-server relationship. For example, the SEQ2SLATE models 140 can be implemented by the server computing system 130 as a portion of a web service (e.g., a search engine service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned SEQ2SLATE models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 and 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the SEQ2SLATE models 120 and/or 140 based on training data 162. The training data 162 can include, for example, click-through logs. The click-through logs can be collected by running the SEQ2SLATE models 120 and/or 140 in the wild. This kind of training data can be collected with little cost, in contrast to human-curated labels/rankings. However, this and other types of training data can additionally and/or alternatively be used. In particular, the training data 162 can include a plurality of training examples. Each training example in the training data 162 can include an input sequence of items $\{x_i, \ldots, x_n\}$ and binary labels $(y_1, \ldots, y_n)$ with $y_i \in \{0, 1\}$ representing user feedback (e.g., click/no-click). The input sequence can be ordered by a base ranker, and when possible will include the per-item score of the base ranker as an additional feature in $x_i$.

The training data can be generated by training the base (e.g., pointwise) ranker from raw data to rank items and simulate a user cascading through the results and clicking on items. Each item in the result can be observed with decaying probability, such that if an item is observed and its ground-truth relevance score is above a threshold, then a click is generated, otherwise no click is generated. Additionally, to introduce high-order interactions, if an item is too similar to a previously clicked item, then no click is generated even when observing a relevant item.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training data 162. In such implementations, the models 120 can be both trained and used locally at the user computing device 102. In some of such implementations, the user computing device 102 can implement the model trainer 160 to personalize the models 120 based on user-specific data.

Example Model Arrangements

Figure 2:
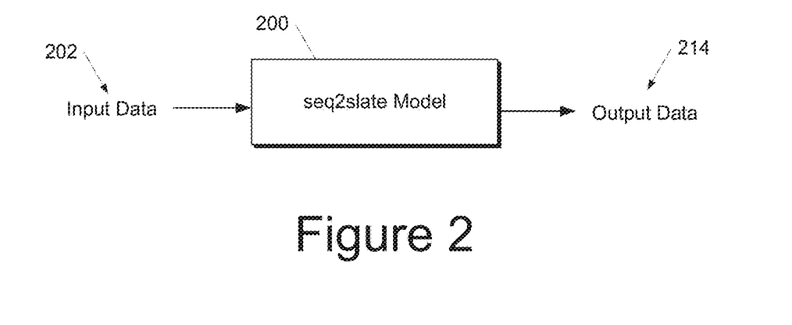
FIG. 2 depicts a block diagram of an example SEQ2SLATE model according to example embodiments of the present disclosure.

FIG. 2 depicts a block diagram of an example SEQ2SLATE model 200 according to example embodiments of the present disclosure. In some implementations, the SEQ2SLATE model 200 is trained to receive input data 202 descriptive of a sequence of candidate items and, as a result of receipt of the input data 202, provide output data 214 that includes a slate of ranked items from the sequence of candidate items. In some implementations, the SEQ2SLATE model 200 can receive input data 202 descriptive of a list of candidate items, as a result of receipt of the input data 202, determine a sequence of the candidate items, and provide output data 214 that includes a slate of ranked items from the sequence of candidate items.

Figure 3:
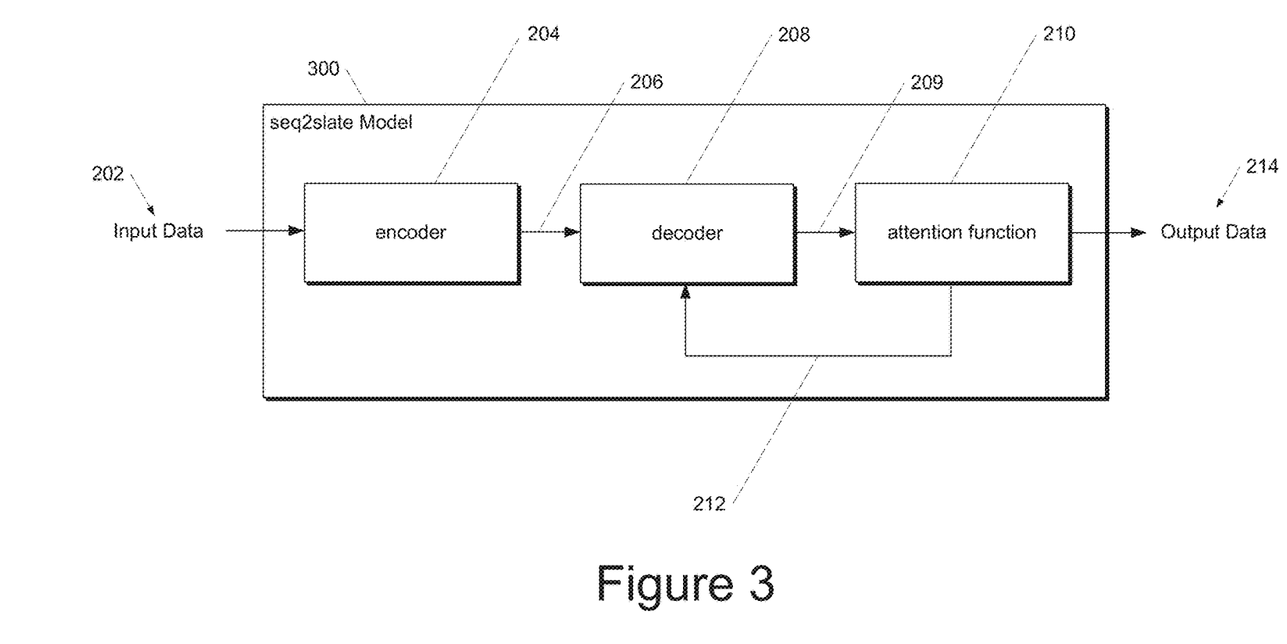
FIG. 3 depicts a block diagram of an example SEQ2SLATE model according to example embodiments of the present disclosure.

FIG. 3 depicts a block diagram of an example SEQ2SLATE model 300 according to example embodiments of the present disclosure. The SEQ2SLATE model 300 is similar to SEQ2SLATE model 200 of FIG. 2 except that SEQ2SLATE model 300 further includes an encoder 204, decoder 208, and attention function 210. The encoder 204 and the decoder 208 can each consist of a recurrent neural network (RNN) that uses Long Short Term Memory cells. The attention function can include a pointer network architecture that uses non-parametric softmax modules, and learns to point to items of its input sequence.

In some implementations, the SEQ2SLATE model 300 is trained to receive input data 202 descriptive of a sequence of candidate items and, as a result of receipt of the input data 202, provide output data 214 that includes a slate of ranked items from the candidate items. In particular, the SEQ2SLATE model 300 can provide the input data 202 into the encoder 204. The encoder 204 can read each item of the sequence of candidate items in the input data 202 sequentially, and at each encoding step the encoder can output a d-dimensional vector for the item, thus transforming the input sequence of candidate items into a sequence of latent memory states 206. The SEQ2SLATE model 300 can provide the sequence of latent memory state 206 into the decoder 208. At each decoding step, the decoder 208 can output a d-dimensional vector 209 which is used as a query in the attention function 210. The attention function 210 can take as input the vector 209 output by the decoder 208 and the latent memory states 206. The attention function 210 can output a probability distribution over the next item from the input sequence of candidate items to include in a sequence of ranked items in the output data 214. The probability distribution can represent the degree to which the SEQ2SLATE model 300 is pointing at a particular input item in the input data 202 at a particular decoding step of the decoder 208. Once the next item to include in the sequence of ranked items in the output data 214 is selected, an embedding 212 of the next item is fed as input to the next decoder step of the decoder 208. The input of the first decoder step can include a learned d-dimensional vector that is shared for all inputs in the input data 202.

In some implementations, the SEQ2SLATE model 300 can be trained by the model trainer 160 using the training data 162. The goal of the model trainer 160 can be to learn the parameters of the SEQ2SLATE model 300 such that a slate of ranked items that corresponds to a "good" ranking is assigned a high probability, and a slate of ranked items in which the positive labels rank higher is considered better. The model trainer 160 can train the SEQ2SLATE model 300 to predict the positive labels at the beginning of the output sequence. In particular, the model trainer 160 can input a sequence of items associated with a training example in the training data 162 into the SEQ2SLATE model 300. The model trainer 160 can train the SEQ2SLATE model 300 directly from the binary labels corresponding to the input sequence of items. For each output step of the SEQ2SLATE model 300, the model trainer 160 can obtain a score for each item in the input sequence of items. The model trainer 160 can define a per-step loss (e.g., a multi-label classification loss) with the binary label that corresponds to an input item as a ground-truth for the item. The model trainer 160 can allow the binary labels to change in each step, depending on previous predictions, so they do not incur a loss after that step. The model trainer 160 can optimize the SEQ2SLATE model 300 for a particular slate size k by only computing the loss for the first k output steps of the SEQ2SLATE model 300.

Example Methods

Figure 4:
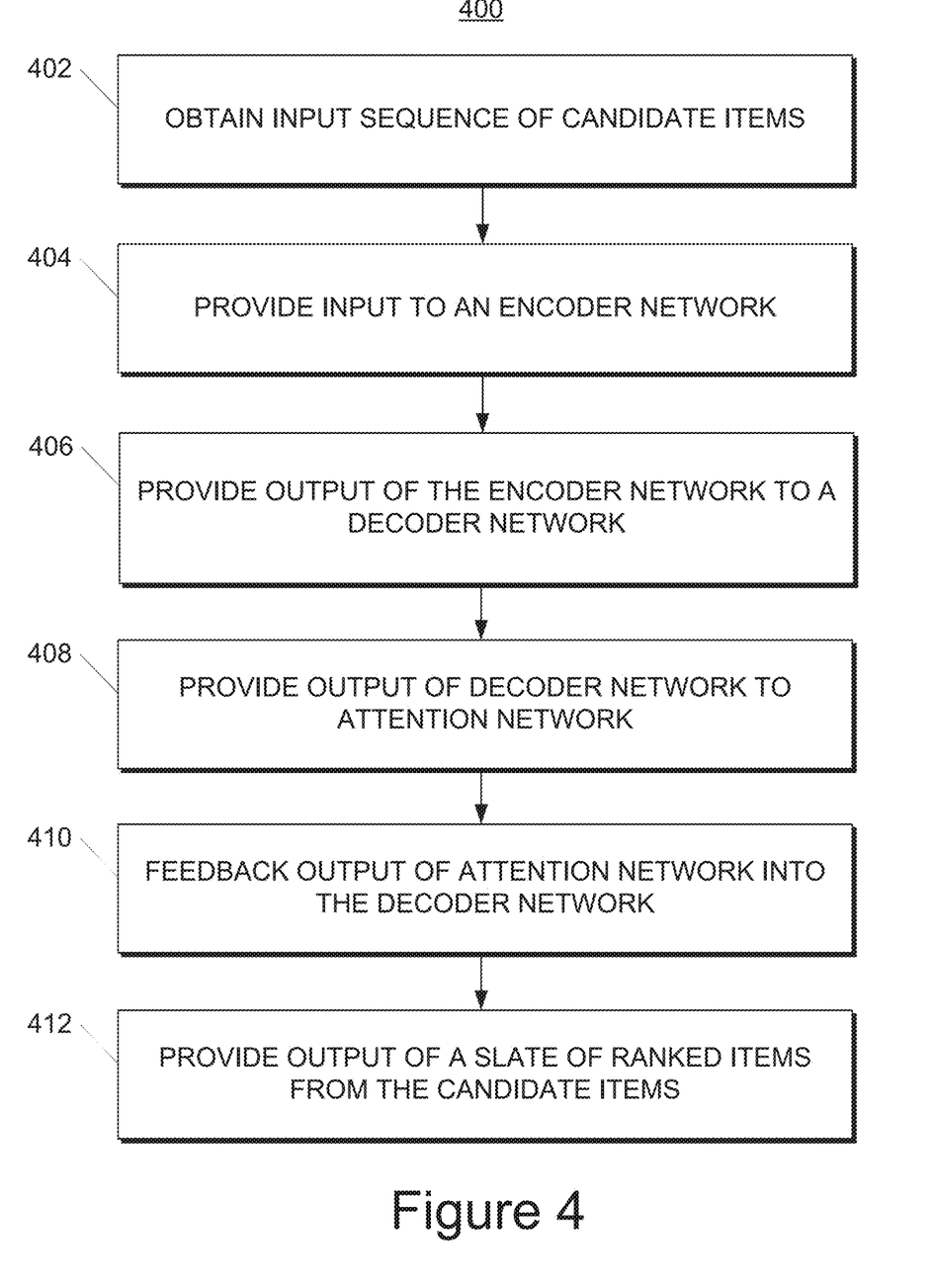
FIG. 4 depicts a flow chart diagram of an example method to generate a slate of ranked items that is appealing as a whole according to example embodiments of the present disclosure.

FIG. 4 depicts a flow chart diagram of an example method 400 to generate a slate of ranked items that is appealing as a whole according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can receive an input sequence of candidate items. For example, the computing system 102/130 can obtain input data 202 that includes a sequence of candidate items. In some implementations, the computing system 102/130 can obtain a list of candidate items, and the computing system 102/130 can determine the sequence of candidate items based on the list by ranking the candidate items in the list using a base ranker.

At 404, the computing system can provide the input to an encoder network. For example, the computing system 102/130 can input the input data 202 into the SEQ2SLATE model 120/140. In particular, the computing system 102/130 can input the sequence of candidate items in the input data 202 into the encoder 204 that consists of a recurrent neural network.

At 406, the computing system can provide an output of the encoder network to a decoder network. For example, the computing system 102/130 can obtain, in response to inputting the sequence of candidate items in the input data 202 into the encoder 204, an output of the encoder 204 that includes a sequence of latent memory states 206. The computing system 102/130 can input the sequence of latent memory states 206 into the decoder 208 that consists of a recurrent neural network.

At 408, the computing system can provide an output of the decoder network to an attention network. For example, the computing system 102/130 can obtain, in response to inputting the latent memory states 206 and an embedding 212 that corresponds to a candidate item selected in response to a previous decoding step of the decoder 208, an output of the decoder 208 that includes an output vector 209. The computing system 102/130 can input a learned vector that is shared for all the candidate items in the input data 202 for a first decoding step of the decoder 208. The computing system 102/130 can input the output vector 209 and the latent memory states 206 into the attention function 210 that consists of a pointer network that points to items of its input sequence.

At 410, the computing system can feedback an output of the attention network into the decoder network. For example, the computing system 102/130 can obtain, in response to inputting the output vector 209 and the latent memory states 206 into the attention function 210, an output of the attention function that includes a probability distribution over one or more candidate items. The computing system 102/130 can select a candidate item to include in a ranking of the candidate items based at least in part on the output of the attention function 210. The computing system 102/130 can input an embedding that corresponds to the selected candidate item into the decoder 208 for use in a next decoder step.

At 412, the computing system can provide an output of a slate of ranked items from the candidate items. For example, the computing system 102/130 can obtain in response to inputting the input data 202 into the SEQ2SLATE model 120/140, an output of the SEQ2SLATE model 120/140 that includes a ranking of the candidate items. The ranking of the candidate items can include a diverse set of the candidate items at the top positions in the ranking such that one or more highly relevant candidate items are demoted in the ranking. The computing system 102/130 can provide the ranking of the candidate items as a slate of ranked items in the output data 214.

Figure 5:
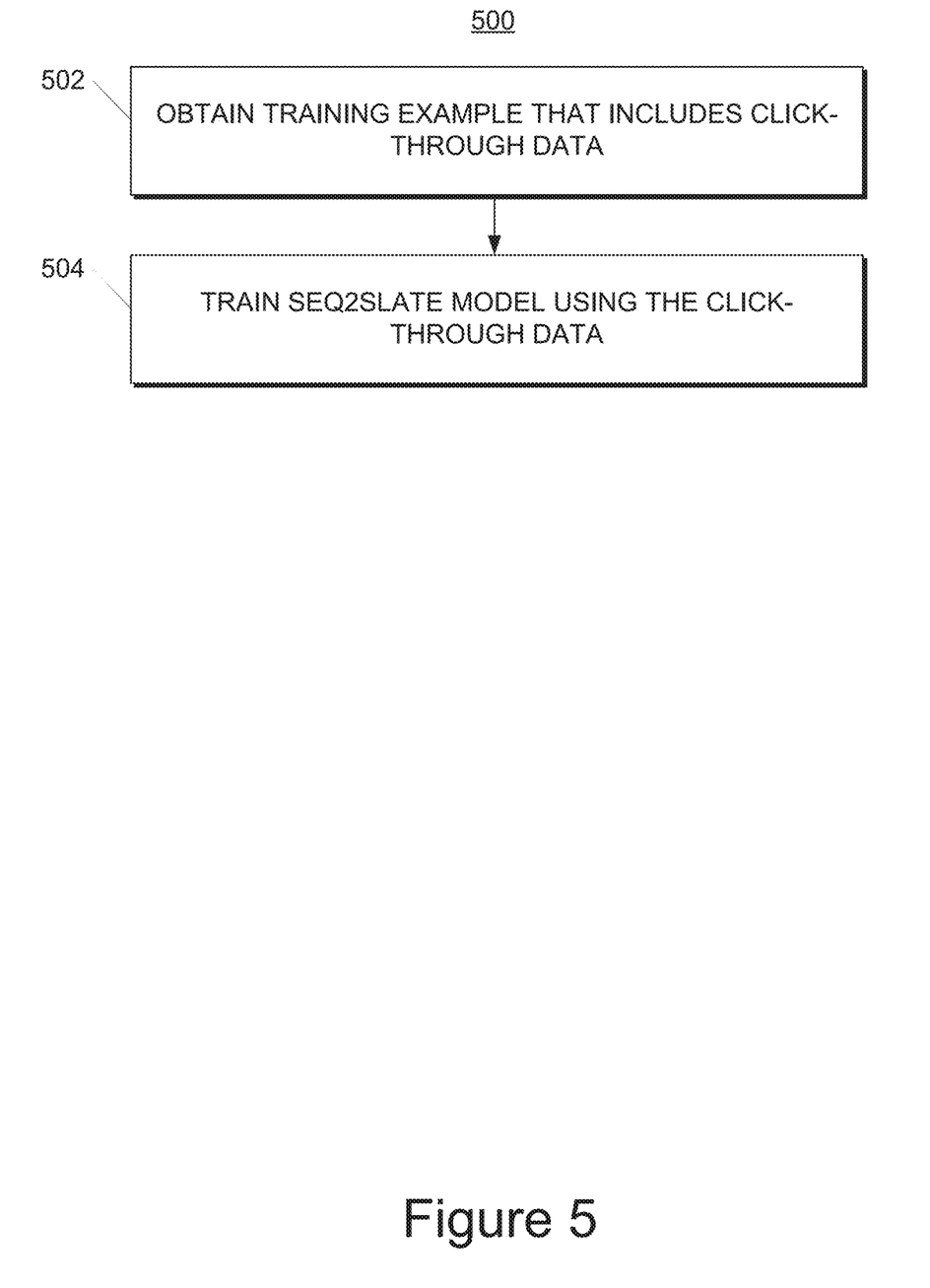
FIG. 5 depicts a flow chart diagram of an example method to train a SEQ2SLATE model according to example embodiments of the present disclosure.

FIG. 5 depicts a flow chart diagram of an example method 500 to train a machine-learned model to generate a slate of ranked items that is appealing as a whole according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, the computing system can obtain a training example that includes click-through data. For example, the computing system 150 can obtain training data 162 that includes one or more training examples. Each training example can include a sequence of items and a plurality of binary labels, each binary label corresponding to an item in the sequence of items. The plurality of binary labels can represent user feedback for the corresponding item in the sequence.

At 504, the computing system can train a SEQ2SLATE model using the click-through data. For example, the computing system 150 can train the SEQ2SLATE model 120/140 with a training example in the training data 162. In particular, the model trainer 160 can input a sequence of items associated with the training example into the SEQ2SLATE model 120/140. In response to inputting the sequence of items, for each output step of the SEQ2SLATE model 120/140, the model trainer 160 can obtain an output of the SEQ2SLATE model 120/140 that includes a score for each item in the input sequence and a prediction of a positive item from the input sequence of items. The model trainer 160 can evaluate a loss associated with the score for each input item by using the binary label that corresponds to the input item as ground-truth, and adjust the binary label corresponding to the predicted item such that the label does not incur a loss in a subsequent step.

Example Pointer Network

Aspects of the present disclosure provide for formalizing the ranking task as follows. Given a set of n items, each represented by a feature vector $x_i \in R^m$, let $\pi \in \Pi$ denote a permutation of the items, where each $\pi_j \in \{1, \ldots, n\}$ denotes the index of the item in position j. The goal is to predict the output ranking $\pi$ given the input items x. In the seq2seq framework, the joint probability of the outputs given the inputs can be expressed as a product of conditional probabilities according to the chain rule:

$$p(\pi | x) = \prod_{j=1}^{n} p(\pi_j | \pi_1, \ldots, \pi_{j-1}, x), \quad (1)$$

Figure 6:
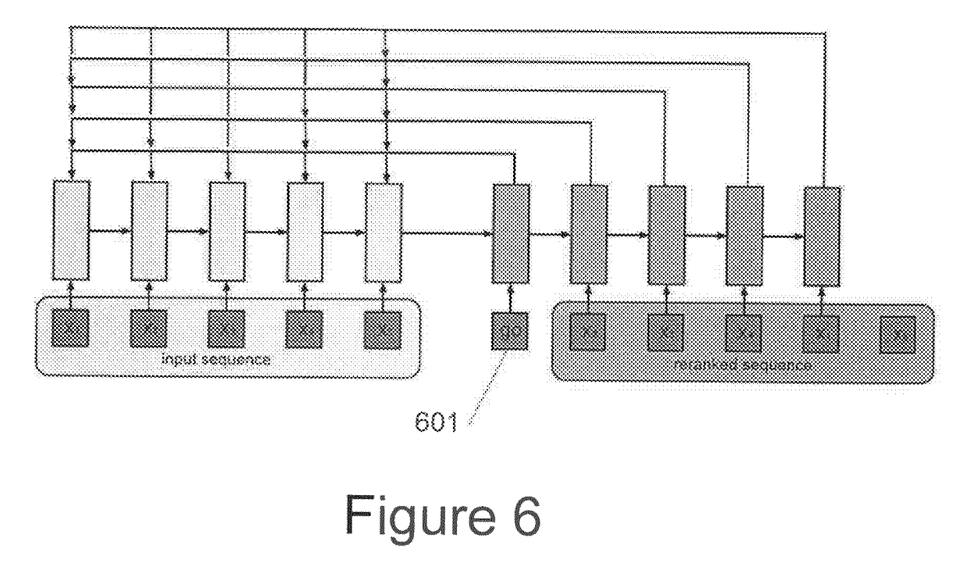
FIG. 6 depicts a block diagram of an example pointer network architecture according to example embodiments of the present disclosure.

The conditional $p(\pi_j = \cdot | \pi_{<j}, x) \in \Delta^n$ (a point in the n-dimensional simplex) models the probability of each item to be at the J'th position in the ranking given the items already placed in previous positions, and captures the high-order dependencies between items in the ranked list. The SEQ2SLATE model provides for inputs of variable size and an output vocabulary size that is not fixed, so n can vary per instance. To address this, a pointer network architecture is used to model the conditional ($p(\pi_j | \pi_{<j}, x)$). An example pointer network architecture for ranking in the SEQ2SLATE model is shown in FIG. 6. The pointer network can use non-parametric softmax modules, and learn to point to items of its input sequence rather than predicting an index from a fixed sized vocabulary.

The SEQ2SLATE model can include two recurrent neural networks (RNN): an encoder and a decoder, both of which can use long short-term memory (LSTM) cells. At each encoding step i, the encoder RNN can read the input vector $x_i$ and output a d-dimensional vector $e_i$, thus transforming the input sequence $\{x_i\}_{i=1}$ into a sequence of latent memory states $\{e_i\}_{i=1}$. At each decoding step j, the decoder RNN outputs a d-dimensional vector $d_j$ which is used as a query in the attention function. The attention function takes as input the query $d_j \in R^d$ and the set of latent memory states computed by the encoder $\{e_i\}_{i=1}^n$ and produces a probability distribution over the next item to include in the output sequence as follows:

$$s_i^j = \begin{cases} -\infty & \text{if } \pi_{j'} = i \text{ for any } j' < j \\ v^T \cdot \tanh(W_{enc} \cdot e_i + W_{dec} \cdot d_j) & \text{otherwise} \end{cases} \quad (2)$$

$$p_\theta(\pi_j = i | \pi_{<j}, x) = \text{softmax}(s^j)_i \equiv p_i^j,$$

where $W_{enc}, W_{dec} \in R^{d \times d}$ and $v \in R^d$ are learned parameters in the network, denoted as $\theta$, and $\text{softmax}(s^j)_i = e^{s_i^j}/\Sigma_n e^d$. The probability $p\theta(\pi_j=i|\pi_{<j}, x)$ represents the degree to which the model i pointing at input i at decoding step j. The scores $s_i^j$ are set to $-\infty$ for items i that already appear in the slate thus enforcing the model to output permutations. Once the next item $\pi_j$ is selected, typically greedily or by sampling, its embedding $x_{\pi_j}$ is fed as input to the next decoder step. The input of the first decoder step is a learned d-dimensional vector shared for all inputs (e.g., label 601 in FIG. 6).

The computational cost of inference is dominated by the sequential decoding procedure, and is $O(n^2)$. Additionally, a computationally cheaper single-step decoder with linear cost $O(n)$ is considered, which outputs a single output vector $p^1$, from which $\pi$ is obtained by sorting values (similarly to pointwise ranking).

According to aspects of the present disclosure, the seq2slate model can be trained from data in which each training example consists of a sequence of items $\{x_1, \ldots, x_n\}$ and binary labels $(y_1, \ldots, y_n)$, with $y_i \in \{0, 1\}$, representing user feedback (e.g., click/no-click). This approach can easily extend to more informative feedback, such as the level of user engagement within the chosen item. The input sequence x can be ordered by a base ranker (e.g., an existing recommender). The input sequence can also include per-item scores from the base ranker as an addition feature for each $x_i$. The goal is to learn the parameters $\theta$ of $p_\theta(\pi_j|\pi_{<j}, x)$ (Eq. (2)) such that permutations $\pi$ corresponding to good rankings are assigned high probabilities. Various ranking metrics $R(\pi, y)$, such as mean-average-precision (MAP) precision at k, or normalized-discounted-cumulative-gains at k (NDCG@k) can be used to measure the quality of $\pi$ given the labels y. Generally, permutations where the positive labels rank higher are considered better.

In some implementations, reinforcement learning (RL) can be used to directly optimize for the ranking measure $\mathcal{R}(\pi, y)$. The objective is to maximize the expected (cumulative) ranking score obtained by sequences sampled from the model: $J(\theta|x, y) = \mathbb{E}_{\pi \sim p_\theta(\cdot|x)} \mathcal{R}(\pi, y)$. Policy gradients and stochastic gradient descent can be used to optimize $\theta$. The gradient can be formulated using REINFORCE update and can be approximated via Monte-Carlo sampling as follows:

$$\nabla_\theta J(\theta | x, y) = \mathbb{E}_{\pi \sim p_\theta(\cdot|x)}[\mathcal{R}(\pi, y) \nabla_\theta \log p_\theta(\pi | x)] \approx$$

$$\frac{1}{B}\sum_{k=1}^{B}(\mathcal{R}(\pi_k, y_k) - b(x_k))\nabla_\theta \log p_\theta(\pi_k | x_k),$$

where k indexes ranking instances in a batch size of B and b(x) denotes a baseline function that estimates the expected rewards to reduce the variance of the gradients.

In some implementations, supervised learning can be used to optimize for the ranking measure $\mathcal{R}$ ($\pi$,y). The seq2seq model can be trained to maximize a likelihood of a target sequence of tokens given an input. Using Eq. (1), this can be done by maximizing the likelihood for each target token given the previous target tokens. Instead, the seq2slate model can be trained directly from the binary labels y (e.g., clicks). The goal in ranking in some examples is to train the model to predict the positive labels at the beginning of the output sequence. Rather than waiting until the end of the output sequence, as in RL, the model can be given feedback at each decoder step. For example, at the first step, the model can assign a score $s_i$ to each item in the input. A per-step loss l(s,y) can be defined which acts as a multi-label classification loss with labels y as ground-truth, such as cross-entropy loss and hinge loss:

$$\ell_{xent}(s, y) = -\sum_i \hat{y}_i \log p_i \quad (3)$$

$$\ell_{hinge}(s, y) = \max\left\{0, 1 - \min_{i:y_i=1} s_i + \max_{j:y_j=0} s_j\right\},$$

where and $\hat{y}_i = y_i/\Sigma_j y_j$ and $p_i$ is defined in Eq. (2). The cross-entropy loss can assign high sores to positive labels, and the hinge loss is minimized when scores of positive labels are higher than scores of negative labels. Both losses are convex functions of the scores s. To improve convergence, a smooth version of the hinge loss can be used to replace the maximum and minimum by their smooth counterparts $$\left(\text{e.g., smooth-max}(s; \gamma) = \frac{1}{\gamma} \log \sum_i e^{\gamma s_i}\right).$$

The smooth minimum can be defined similarly, using $\min_i (s_i) = -\max_i(-s_i)$. Instead of simply applying a per-step loss from Eq. (3) to all steps of the output sequence while reusing the same labels y at each step, y can be allowed to change at each decoding step and labels of already chosen items can be set to zero so they do not incur loss after that step:

$$\tilde{y}^j(y, \pi)_i = \begin{cases} 0 & \text{if } \pi_{j'} = i \text{ for any } j' < j \\ y_i & \text{otherwise} \end{cases}.$$

Once all positive labels are predicted, $\tilde{y}=0$ and $l(s,\tilde{y})=0$ for all s. In order to match the model behavior at training to the behavior of inference, the scores s are set to $-\infty$ which enforces a permutation constraint on the output. The corresponding label is also set to 0 so that the loss will not be unbounded. The overall sequence loss is then:

$$\mathcal{L}(S, y) = \sum_{j=1}^{n} w_j \ell(s^j, \tilde{y}^j(y, \pi(S))), \quad (4)$$

where $S=\{s^j\}_{j=1}^n$, and $\tilde{y}^j(y,\pi(S))$ refers to the adjusted labels. A per-step weight $w_j$ can be used to encourage better performance at the beginning of the sequence (e.g., $w_j=1/\log(j)$). If optimizing for a particular slate size k, this loss can be computed only for the first k output steps. Using the sequence loss in Eq. (4), the SEQ2SLATE model can be trained end-to-end using back-propagation.

Additional Disclosure

The systems and methods discussed herein may provide a number of technical effects and benefits. For instance, the disclosed techniques enable a model (e.g., SEQ2SLATE) that can predict a next item to place on a slate given the items already chosen from a list of candidate items. By capturing complex dependencies between candidate items that accounts for high-order interactions between the items, a diverse set of items can be presented at the top positions on the slate (as opposed to presenting items based solely on a ranking score). This can be advantageous when, for example, a ranking score of an item depends on other items in the candidate list and their joint placement. Such interactions between items can be especially dominant where display area is limited (and fewer items can be presented) or when a strong position bias is present. In these cases only a few highly ranked items may get the user's attention. By presenting a more diverse set of items, a wider range of user interests can be represented, thus improving the user experience. Moreover, computational resources can be conserved by efficient encoding and decoding techniques as well as the use of an attention network.

Additionally, the present disclosure enables the SEQ2SLATE model to consider the dependencies between candidate times in a flexible and scalable manner that naturally accounts for high-order interactions. In this way, the model can consider the inter-item dependences at inference time (as opposed to only when training the model) without restricting the functional form of the relational terms to simple functions (e.g., submodular) in order to obtain tractable inference and learning algorithms. Thus, the model's expressive power can be maintained, allowing the model to capture rich dependencies between ranked items, while keeping the computational cost of inference manageable.

The present disclosure further enables the SEQ2SLATE model to be trained end-to-end using weak supervision in the form of binary click-through logs. Such click-through logs are generally easier to obtain end less expensive than relying on relevance scores or ground-truth rankings. By enabling a model that can be trained using binary click-through logs, more training data at lower cost can be used to train the model, thus improving both training efficiency and the model's efficacy.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system comprising:
one or more processors; and
one or more non-transitory computer readable media that collectively store:
a machine-learned pointer network for generating an output sequence from a list of candidate items, wherein the output sequence comprises a ranking of the candidate items, wherein the ranking of the candidate items orders the candidate items included in the output sequence based on a respective probability of user engagement with each candidate item included in the output sequence, the machine-learned pointer network comprising:
an encoder network configured to receive the list of candidate items and provide an output that includes a sequence of latent memory states;
a decoder network configured to receive a previously-selected candidate item for the output sequence and provide an output vector based at least in part on the previously-selected candidate item; and
an attention network configured to receive the sequence of latent memory states and a query including the output vector from the decoder network, the attention network configured to produce a probability distribution associated with a next candidate item to include in the output sequence, wherein the attention network produces the probability distribution based at least in part on candidate items that already appear in the output sequence;
wherein the machine-learned pointer network has been trained on a training dataset comprising a plurality of training examples, wherein each training example comprises a sequence of training items and a sequence of labels respectively associated with the sequence of training items, wherein the respective label for each training item indicates a level of user engagement with the training item; and
wherein the one or more non-transitory computer readable media also collectively store instructions that, when executed by the one or more processors, cause the computer system to perform operations, the operations comprising:
providing an input associated with the list of candidate items to the machine-learned pointer network;
implementing the machine-learned pointer network to process the list of candidate items;
receiving an output generated by the machine-learned pointer network as a result of processing the list of candidate items; and
selecting the next candidate item to include in the output sequence based at least in part on the probability distribution.

2. The computer system of claim 1, wherein:
the attention network assigns scores to the list of candidate items as part of producing the probability distribution; and
the scores assigned to candidate items that already appear in the output sequence are lower than the scores assigned to candidate items that do not already appear in the output sequence.

3. The computer system of claim 2, wherein:
the scores assigned to candidate items that already appear in the output sequence enforces the attention network to output permutations.

4. The computer system of claim 1, wherein the list of candidate items comprises a sequence of features associated with the list of candidate items.

5. The computer system of claim 1, wherein, for at least one of the plurality of training examples, the respective label for each training item comprises a binary label that indicates whether a user clicked or did not click on the training item.

6. A computer-implemented method to train a machine-learned pointer network, the method comprising:
obtaining, by one or more computing devices, data descriptive of the machine-learned pointer network configured to generate an output sequence from a list of candidate items, wherein the output sequence comprises a ranking of the candidate items, wherein the ranking of the candidate items orders the candidate items included in the output sequence based on a respective probability of user engagement with each candidate item included in the output sequence, wherein the machine-learned pointer network comprises an encoder network configured to receive the list of candidate items and provide an output that includes a sequence of latent memory states, a decoder network that operates over a plurality of decoding steps and is configured to receive a previously-selected candidate item for the output sequence and provide an output vector based at least in part on the previously-selected candidate item, and an attention network configured to receive the sequence of latent memory states and a query including the output vector from the decoder network, wherein the attention network is configured to produce a probability distribution associated with a next candidate item to include in the output sequence, and wherein, at each of the plurality of decoding steps, the attention network assigns scores to the list of candidate items as part of producing the probability distribution;
training, by the one or more computing devices, the machine-learned pointer network based on a set of training data comprising a plurality of training examples, wherein each training example comprises a sequence of training items and a sequence of labels respectively associated with the sequence of training items, wherein the respective label for each training item indicates a level of user engagement with the training item,
wherein training, by the one or more computing devices, the machine-learned pointer network comprises:
determining, by the one or more computing devices, a per-step loss for two or more of the plurality of decoding steps, the per-step loss at each of the two or more of the plurality of decoding steps representing a performance evaluation of the machine-learned pointer network based on the set of training data at such decoding step, and wherein the per-step loss at each of the two or more of the plurality of decoding steps considers only training labels assigned to training items that have not been previously selected for inclusion in the output sequence; and modifying, by the one or more computing devices, one or more parameters of the machine-learned pointer network based at least in part on the per-step loss.

7. The computer-implemented method of claim 6, wherein training, by the one or more computing devices, the machine-learned pointer network comprises:

enforcing a permutation constraint on an output of the machine-learned pointer network.

8. The computer-implemented method of claim 6, wherein modifying, by the one or more computing devices, one or more parameters of the machine-learned pointer network comprises backpropagating the per-step loss to train the machine-learned pointer network end-to-end.

9. The computer-implemented method of claim 6, wherein feedback based on the per-step loss is provided to the machine-learned pointer network at each of a plurality of decoding steps of the decoder network.

10. The computer-implemented method of claim 6, wherein, for at least one of the plurality of training examples, the respective label for each training item comprises a binary label that indicates whether a user clicked or did not click on the training item.

11. The computer-implemented method of claim 6, wherein the per-step loss at each of the two or more of the plurality of decoding steps comprises a respective per-step weight.

12. The computer-implemented method of claim 11, wherein the per-step weights associated with the two or more decoding steps decrease in magnitude over the two or more of the plurality of decoding steps.

13. The computer-implemented method of claim 6, wherein determining, by the one or more computing devices, the per-step loss for the two or more of the plurality of decoding steps comprises, for each training example and for each of the two or more of the plurality of decoding steps, adjusting to equal zero, by the one or more computing devices, each label in the sequence of labels that corresponds to training items that have been previously selected for inclusion in the output sequence.

14. A computer-implemented method to generate an output sequence from a list of candidate items, the method comprising:

ranking, by one or more computing devices, the list of candidate items to generate an initial sequence of candidate items;

inputting, by the one or more computing devices, the initial sequence of candidate items into an encoder network configured to receive the initial sequence of candidate items and provide an output that includes a sequence of latent memory states;

inputting, by the one or more computing devices, a previously-selected candidate item for the output sequence into a decoder network configured to receive the previously-selected candidate item and provide an output vector based at least in part on the previously-selected candidate item; and inputting the sequence of latent memory states and a query including the output vector from the decoder network into an attention network configured to receive the sequence of latent memory states and the query including the output vector from the decoder network, the attention network configured to produce a probability distribution associated with a next candidate item to include in the output sequence, wherein the output sequence comprises a ranking of the candidate items, wherein the ranking of the candidate items orders the candidate items included in the output sequence based on a respective probability of user engagement with each candidate item included in the output sequence;

wherein the encoder network, the decoder network, and the attention network have been jointly trained on a training dataset comprising a plurality of training examples, wherein each training example comprises a sequence of training items and a sequence of labels respectively associated with the sequence of training items, wherein the respective label for each training item indicates a level of user engagement with the training item.

15. The computer-implemented method of claim 14, wherein:

the decoder network operates over a plurality of decoding steps including a first decoding step; and a learned vector is provided as an input to the first decoding step, and in response the decoder network provides an output vector based at least in part on the learned vector.

16. The computer-implemented method of claim 15, wherein:

the plurality of decoding steps includes a second decoding step; and the method further comprises inputting an embedding that corresponds to the previously-selected candidate item into the second decoding step of the decoder network.

17. The computer-implemented method of claim 14, wherein the list of candidate items comprises a sequence of features associated with the list of candidate items.

18. The computer-implemented method of claim 14, wherein the encoder network, the decoder network, and the attention network are part of a machine-learned pointer network that is trained to point to candidate items in the list of candidate items based on a plurality of learned parameters.

19. The computer-implemented method of claim 14, wherein the attention network is configured to produce the probability distribution based at least in part on candidate items that already appear in the output sequence.

20. The computer-implemented method of claim 14, wherein a score assigned to each candidate item that already appears in the output sequence enforces the attention network to output permutations.

* * * * *